(12) United States Patent
MacMullen (10) Patent No.: US 9,749,772 B2
(45) Date of Patent: Aug. 29, 2017

(54) VERY LONG FRAME IN A MACHINE TO MACHINE COMMUNICATION NETWORK

(75) Inventor: Neil MacMullen, Cambridge (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 14/125,849

(22) PCT Filed: May 17, 2012

(86) PCT No.: PCT/EP2012/059221
§ 371 (c)(1),
(2), (4) Date: Apr. 16, 2014

(87) PCT Pub. No.: WO2012/171743
PCT Pub. Date: Dec. 20, 2012

(65) Prior Publication Data
US 2014/0226637 A1   Aug. 14, 2014

(30) Foreign Application Priority Data

Jun. 13, 2011 (GB) .................................. 1109848.0
Sep. 30, 2011 (GB) .................................. 1116910.9

(51) Int. Cl.
*H04W 4/00* (2009.01)
*H04W 72/04* (2009.01)
(Continued)

(52) U.S. Cl.
CPC ......... *H04W 4/005* (2013.01); *H04W 72/042* (2013.01); *H04W 72/0446* (2013.01);
(Continued)

(58) Field of Classification Search
CPC .............. H04W 4/005; H04W 72/042; H04W 72/0446; H04W 84/042; H04W 16/14;
(Continued)

(56) References Cited

U.S. PATENT DOCUMENTS 5,404,355 A * 4/1995 Raith .................... H04W 48/12
340/7.24
5,748,147 A * 5/1998 Bickley et al. ................ 342/457
(Continued)

FOREIGN PATENT DOCUMENTS

EP          2148545 A2     1/2010
JP        2006343984 A    12/2006
(Continued)

OTHER PUBLICATIONS

William Webb, "Weightless Technology an Overview", Mar. 28, 2012, pp. 1-16, XP55030536, retrieved on Jun. 20, 2012 from: http://www.weightless.org/documents/download/ee575c15ed123be7c9e119d52bc48d1d4f73162892123.
(Continued)

*Primary Examiner* — Kwang B Yao
*Assistant Examiner* — Ricardo Castaneyra
(74) *Attorney, Agent, or Firm* — Slater Matsil, LLP (57) ABSTRACT

The present invention relates to communication via a series of bidirectional frames. A communication device is configured to communicate according to a protocol in which data is communicated via a series of frames, and every frame comprises: a downlink portion for transmissions by the communication device, said downlink portion comprising a control portion; and an uplink portion for transmissions to the communication device; and the duration of each frame is greater than one second.

20 Claims, 2 Drawing Sheets

(51) Int. Cl.
  *H04B 7/26* (2006.01)
  *H04W 16/14* (2009.01)
  *H04W 84/04* (2009.01)

(52) U.S. Cl.
  CPC ........... *H04B 7/2656* (2013.01); *H04W 16/14* (2013.01); *H04W 84/042* (2013.01)

(58) Field of Classification Search
  CPC ........... H04W 72/0413; H04W 74/002; H04W 72/0453; H04W 74/08; H04W 72/04; H04W 74/0833; H04W 72/0406; H04B 7/2656; H04L 5/0053; H04L 5/0055; H04L 1/1861
  USPC .......................................... 370/280, 321, 336
  See application file for complete search history.

(56) References Cited

U.S. PATENT DOCUMENTS

| | | | | |
|---|---|---|---|---|
| 6,411,608 | B2* | 6/2002 | Sharony | H04Q 7/20 370/318 |
| 8,396,086 | B1* | 3/2013 | Gossett | H04W 74/08 370/236 |
| 8,897,394 | B1* | 11/2014 | Nabar | H04L 5/0069 375/260 |
| 2002/0080816 | A1* | 6/2002 | Spinar et al. | 370/449 |
| 2003/0063619 | A1* | 4/2003 | Montano | H04L 29/12009 370/443 |
| 2006/0184854 | A1* | 8/2006 | Ihm | H04L 1/1614 714/749 |
| 2007/0149242 | A1* | 6/2007 | Kim | H04J 11/004 455/525 |
| 2007/0248076 | A1 | 10/2007 | Ji et al. | |
| 2007/0280184 | A1* | 12/2007 | Shin et al. | 370/338 |
| 2008/0250294 | A1 | 10/2008 | Ngo et al. | |
| 2008/0259857 | A1* | 10/2008 | Zheng | H04B 7/155 370/329 |
| 2009/0041166 | A1* | 2/2009 | Patel | H03M 13/3746 375/341 |
| 2009/0180402 | A1* | 7/2009 | Lindoff | H04B 1/44 370/277 |
| 2009/0215464 | A1* | 8/2009 | Tanno | H04W 74/0833 455/450 |
| 2010/0124194 | A1* | 5/2010 | Chun | H04W 48/10 370/329 |
| 2010/0142458 | A1* | 6/2010 | Mark | H04W 52/143 370/329 |
| 2010/0177697 | A1* | 7/2010 | Tanno | H04W 48/12 370/328 |
| 2010/0202349 | A1 | 8/2010 | Guan | |
| 2011/0134850 | A1 | 6/2011 | Kishigami et al. | |
| 2011/0194432 | A1* | 8/2011 | Kato | H04W 74/002 370/252 |

FOREIGN PATENT DOCUMENTS

| | | |
|---|---|---|
| JP | 200885718 A | 4/2008 |
| JP | 2010034625 A | 2/2010 |
| JP | 2011525784 A | 9/2011 |
| WO | 2006027672 A2 | 3/2006 |
| WO | 2008056023 A1 | 5/2008 |
| WO | 2010008845 A2 | 1/2010 |
| WO | 2010018690 A1 | 2/2010 |
| WO | 2010111428 A2 | 9/2010 |
| WO | 2011163287 A2 | 12/2011 |

OTHER PUBLICATIONS

Wavecom Online Help 8.0, "Transmission Modes : PACTOR-II", retrieved on Mar. 14, 2012 from http://www.wavecom.ch/onlinehelp/WCODE/#!worddocuments/pactorii.htm.

\* cited by examiner

VERY LONG FRAME IN A MACHINE TO MACHINE COMMUNICATION NETWORK

The present invention relates to communication via a series of bidirectional frames.

A wireless network may be configured to operate without having been specifically allocated any part of the electromagnetic spectrum. Such a network may be permitted to operate in so-called whitespace: a part of the spectrum that is made available for unlicensed or opportunistic access. Typically whitespace is found in the UHF TV band and spans 450 MHz to 800 MHz, depending on the country. A large amount of spectrum has been made available for unlicensed wireless systems in this frequency range.

A problem with operating in whitespace is that the available bandwidth is variable and cannot be guaranteed. These limitations are well-matched to the capabilities of machine-to-machine networks in which there is no human interaction. Machine-to-machine networks are typically tolerant of delays, dropped connections and high latency communications.

Any network operating in the UHF TV band has to be able to coexist with analogue and digital television broadcast transmitters. The density of the active television channels in any given location is relatively low (resulting in the availability of whitespace that can be used by unlicensed systems). The FCC has mandated that systems operating in the whitespace must reference a database that determines which channels may be used in any given location. This is intended to avoid interference with the TV transmissions and certain other incumbent systems such as wireless microphones.

The whitespace database does not include information about every possible source of interference. For example, a television transmitter may be intended to broadcast to only a particular coverage area, but may in fact leak into nearby areas in which the frequencies being used by that transmitter appear, at least from the whitespace database, to be available for unlicensed use. Transmissions from major TV stations can in fact be well above the thermal noise at distances of 100 km from the station. Although the signal from such a transmitter may not be strong enough to be reliably received by television antennas in nearby areas, it is often strong enough to cause severe interference to a whitespace network operating in those areas. This interference may affect base stations especially, particularly if they have elevated antennas (which many have in order to increase their coverage area). On nominally free channels, reception is more likely to be dominated by distant TV broadcasts than thermal noise, especially in rural regions. This interference can render many of the whitespace channels unusable or severely compromised.

Further sources of interference may include: spurious emissions from nearby TV transmitters; devices operating in other wireless networks, such as Wi-Fi devices, wireless microphones, and other unlicensed users operating in whitespace; and unintended emissions of devices that are not part of a wireless network, e.g. spurious emissions from faulty electric drills.

Another problem with the database system is that increased sun spot activity tends to create abnormal propagation conditions at UHF. These abnormal propagation conditions may render some of the information in the database irrelevant, so that the database approach becomes decreasingly robust.

Often interference is localised, so that while the ability of some terminals to receive information on one or more frequencies is negatively impacted, the other terminals in a cell may be unaffected. Terminals attached to the same base station may therefore have different communication capabilities due to extrinsic factors. In addition, some of the terminals may have intrinsically different communication capabilities due to their physical attributes like antenna type, circuitry etc. This is particularly true in machine-to-machine networks, which may be formed of cells covering a large geographical area and comprising a large number of different devices.

Another problem faced in the implementation of communication networks, particularly wireless networks, is that terminals often have power constraints. For example mobile terminals are commonly battery powered, and not all fixed terminals have easy access to a mains electricity supply, for example due to being located in remote or inaccessible places. A way of improving power efficiency in a terminal is for it to enter a low power "sleep" mode whenever it is not actively engaged in communication. However this creates a new problem if the terminal is required to rapidly "wake up" and begin communicating at an unscheduled time since it takes time to come out of sleep mode and acquire or re-engage with a network. A terminal will typically be required to receive and interpret some control information transmitted by a base station or access point before it can commence communication over a network.

There is therefore a need for a method of communicating over a network with limited available bandwidth without unduly restricting access to the network.

According to a first embodiment of the invention, there is provided a communication device configured to communicate according to a protocol in which data is communicated via a series of frames, and every frame comprises: a downlink portion for transmissions by the communication device, said downlink portion comprising a control portion; and an uplink portion for transmissions to the communication device; and the duration of each frame is greater than one second.

The communication device may be configured to communicate via a series of frames, each frame having the same duration, that duration being, for example, 2 seconds.

The communication device may be configured to transmit the control portion of each frame using a relatively low data rate so as to maximise the likelihood of the control portion being successfully received by a terminal. That data rate may be the lowest data rate supported by the communication device.

The communication device may be configured to communicate with a plurality of terminals. It may be configured to transmit the control portion of each frame using the lowest data rate required by the plurality of terminals, or using the lowest data rate required by all terminals connected to a cell with which the communication device is associated.

The communication device as may be configured to arrange the downlink portion of each frame so that every downlink portion comprises: a control portion; and a data portion. The communication device may be configured to arrange the data portion of the downlink portion of each frame so that the data portion of each frame comprises a series of time slots, the communication device being configured to: allocate a time slot to a communication with a terminal; and communicate with that terminal in the allocated time slot.

The communication device may be configured to communicate via a wireless network. That wireless network could operate in whitespace and may be configured for machine-to-machine communication.

According to a second aspect of the present invention, there is provided a method for communicating via a series of frames, by arranging each frame so that every frame comprises: a downlink portion, said downlink portion comprising a control portion; and an uplink portion; the total duration of each frame being greater than one second.

For a better understanding of the present invention, reference is made by way of example to the following figures, in which.

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In one embodiment of the invention, a communication device may communicate via a series of very long bidirectional frames. That is, each frame may contain at least a downlink portion for the communication device to transmit information to a terminal or terminals on, that information including control information, and an uplink portion in which one or more terminals may transmit to the communication device; and the duration of each frame may be greater than one second. The downlink portion may comprise both the control information portion and a data portion.

In communication networks with limited available bandwidth, and particularly where bandwidth availability is not guaranteed and can therefore be highly dynamic (such as whitespace networks) the need for re-transmissions can be reduced by spreading the data with a spreading code to increase its robustness, however this can result in a low data rate. It may also be necessary to use large spreading factors and therefore low data rates for communicating over long distances, for example if a base station has a wide coverage area. However if a low data rate is used with, for example, a conventional MAC (medium access control) frame for mobile wireless communication (each frame being of the order of 1-10 ms in length), not very much information can be conveyed in each frame.

In networks where some of the terminals need to make use of sleep modes transmitting control information regularly, ideally in every frame, means that terminals can acquire or re-connect to the network rapidly on waking. This can be highly advantageous if, for example, one or both of such a terminal and a base station are mobile and they are only within range of one another for brief periods, or if a new terminal needs to connect to the network in order to convey some urgent information.

Transmitting control information in every frame or a high proportion of frames can also allow terminals to spend a higher proportion of time in sleep mode, thus reducing power consumption and extending battery life. For example if a terminal receives control information informing it of when the next communication allocated to it will be it can immediately enter sleep mode with wake-up scheduled for immediately before the time allocated for that communication.

However control information, particularly if comprehensive enough to provide all the information required for a terminal to acquire or re-connect to a network in only one frame, has a high overhead. Such control information alone could take up, for example, approximately 100 bytes. Bidirectional frames also need to accommodate uplink communications, and often other data than just the control information needs to be transmitted in the downlink portion of each frame.

If data rates are restricted by limited: available bandwidth it could take 0.1 ms to transmit each bit. Therefore 200 ms could be required just to transmit 2000 bits of control information. Consequently a typical MAC frame of duration 1-10 ms is not adequate. In the system described herein, this problem is addressed by providing frames of an exceptionally long duration: greater than one second. For a machine-to-machine network operating in whitespace, a suitable frame duration might even be of the order of 2 seconds.

A communication device may be configured to transmit the control portion using a relatively low data rate so as to maximise the likelihood of the plurality of terminals being able to receive at least the control portion of the frame. Preferably the relatively low data rate is the lowest data rate associated with the plurality of terminals for which the control portion is intended (which may be all of the terminals connected to the cell with which the communication device is associated) or it may simply be the lowest data rate that the communication device is capable of supporting. The lowest data rate may be generated by means of the highest spreading factor.

The communication device may be configured to communicate with a plurality of terminals by means of a series of periodic communications having a predetermined structure. A single instance of that periodic communication structure may be termed a "frame". A typical frame may start with a preamble and end with an uplink section.

One or more embodiments of the invention will now be described with specific reference to a wireless network in which the communication device is a base station. This is for the purposes of example only and it should be understood that the broadcast mechanisms described herein may be implemented in any suitable communication device, irrespective of what particular role that device plays within the network.

Figure 1:
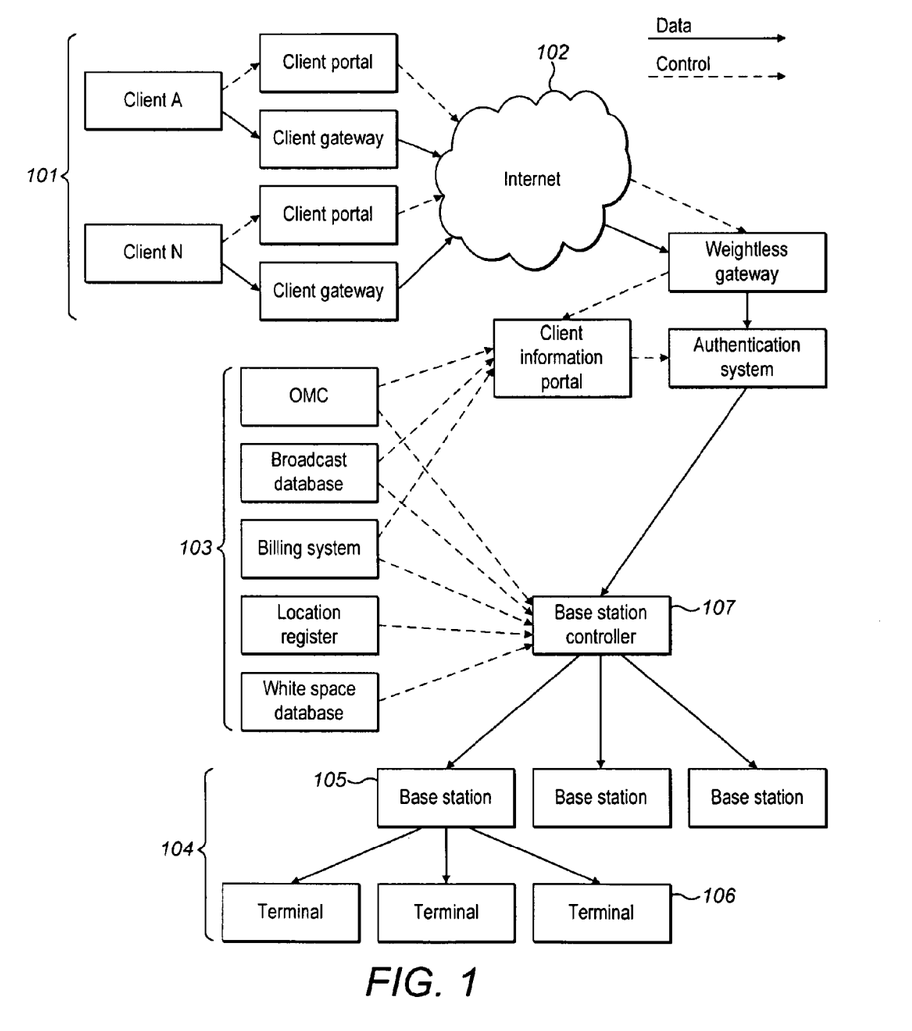
FIG. 1 shows an example of a machine-to-machine network.

An example of a wireless network is shown in FIG. 1. The network, shown generally at 104, comprises one or more base stations 105 that are each capable of communicating wirelessly with a number of terminals 106. Each base station may be arranged to communicate with terminals that are located within a particular geographical area or cell. The base stations transmit to and receive radio signals from the terminals. The terminals are suitably entities embedded in machines or similar that communicate with the base stations. Suitably the wireless network is arranged to operate in a master-slave mode where the base station is the master and the terminals are the slaves.

The base station controller 107 is a device that provides a single point of communication to the base stations and then distributes the information received to other network elements as required. That is, the network is based around a many-to-one communication model. The network may be arranged to communicate with a client-facing portion 101 via the internet 102. In this way a client may provide services to the terminals via the wireless network.

Other logical network elements shown in this example are:

Core network. This routes traffic information between base stations and client networks, Billing system. This records utilisation levels and generates appropriate billing data.

Authentication system. This holds terminal and base station authentication information.

Location register. This retains the last known location of the terminals.

Broadcast register. This retains information on group membership and can be used to store and process acknowledgements to broadcast messages.

Operations and maintenance centre (OMC). This monitors the function of the network and raises alarms when errors are detected. It also manages frequency and code planning, load balancing and other operational aspects of the network.

Whitespace database. This provides information on the available whitespace spectrum.

Client information portal. This allows clients to determine data such as the status of associated terminals, levels of traffic etc.

In practice, many of the logical network elements may be implemented as databases running software and can be provided on a wide range of platforms. A number of network elements may be physically located within the same platform.

A network such as that shown in FIG. 1 may be used for machine-to-machine communications, i.e. communications that do not involve human interaction. Machine-to-machine communications are well-matched to the limitations of operating in whitespace, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are able to tolerate the delays and breaks in communication that can result from these varying communication conditions. Services can be provided in non real-time; low latency is not important as long as data is reliably delivered.

The network preferably employs frequency hopping as a tool for both avoiding interferers and for avoiding causing interference to other users. Frequency hopping may advantageously:

Minimise the interference to TV reception since no downlink will be permanently causing interference to any given TV receiver.

Reduce the probability of the terminal being in a long-term fade (lasting multiple frames) and hence provide a form of interleaving that enables more efficient error correction to be used.

A suitable hopping rate for the downlink channels may be the frame rate, so that each frame is transmitted on a different frequency from the preceding frame. The frames for a network designed to operate in whitespace for machine-to-machine communication may be particularly long. In one example the frames may each be 2 seconds long, giving a frequency hop on the downlink every 2 seconds (which is 30 hops per minute). Frequency hopping sequences may be coordinated over neighbouring base stations to try to minimise instances in which neighbouring base stations are transmitting on the same frequency. One straightforward option is for base stations to use the group of available frequencies in either ascending or descending order, with each base station applying a different offset to the sequence and so commencing its respective sequence on a different frequency from other base stations.

Figure 2:
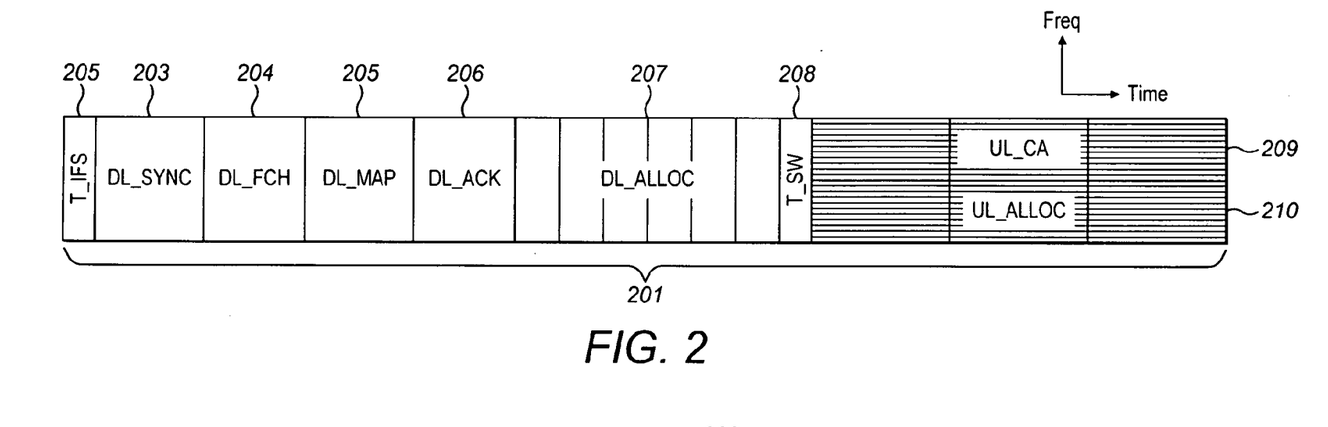
FIG. 2 shows an example of a frame structure.

In one embodiment, the network may use medium access control (MAC) to share the same radio resource between multiple terminals. An example of a suitable frame structure is shown in FIG. 2. The frame (shown generally at 201) comprises time to ramp-up to full output power 202 (T_IFS), a synchronisation burst 203 (DL_SYNC), an information field providing the subsequent channel structure 204 (DL_FCH), a map of which information is intended for which terminal 205 (DL_MAP), a field to allow acknowledgement of previous uplink transmissions 206 (DL_ACK) and then the actual information to be sent to terminals 207 (DL_ALLOC). There is then a guard period for ramp-down of the downlink and ramp-up on the uplink 208 (T_SW), followed by the allocated uplink data transmissions 210 (UL_ALLOC) in parallel with channels set aside for uplink contended access 209 (UL_CA).

Each frame may be broadly divided into control fields, such as DL_SYNC, DL_FCH, DL_MAP and DL_ACK, which impart information to the terminals about the function of the network and the arrangement of the frame, and data fields, such as DL_ALLOC, UL_ALLOC and UL_CA that are used to transfer actual information between the base station and the terminals. Preferably the base station transmits the control fields using a mode that is appropriate for all of the terminals that the frame is intended for, so that (as far as possible) all of the terminals who wish to receive that control information are capable of doing so.

The data rate in the protocol can be variable, but the protocol is capable of supporting a particularly low minimum data rate. For example, the minimum instantaneous data rate (over the air) can be 100 bits per second or less. This would be inadequate for most applications, but in the case of machine-to-machine communications a data rate of this type is adequate for many purposes and can improve tolerance to interferers.

Preferably, the data rate selected for transmission may be the lowest data rate required by any of the terminals for which the frame is intended or more generally for any of the terminals in the cell. Alternatively the lowest data rate that the base station is capable of transmitting with may be selected. For some cases, the lowest data rate may be achieved by employing the highest spreading factor.

It may be particularly advantageous for one or more of the control fields to be transmitted at the lowest data rate supported by the base station. This will assist all terminals to receive those fields, even those that have not yet attached and for which the base station has no information. The uplink CA slots, on the other hand, may be transmitted using the lowest data rate supported in the cell, or another data rate.

The DL_FCH may include information to enable the terminals to determine the hopping sequence. The DL_FCH may include a list of the frequencies that are included in the sequence. If the frequency hopping sequence is just an ascending/descending sequence, one efficient way of communicating it is by means of a channel map, with a bit being set if the channel is in use in the base station. The DL_FCH may also include a MAC Frame count (16-bit) enabling terminals to determine where the base station is in its hopping pattern. Finally, the DL_FCH may indicate the spreading factor used for transmitting the DL_MAP.

The DL_MAP informs terminals as to whether there is any information for them in the frame and whether they have an uplink slot reserved for them to transmit information. It comprises a table of terminal identities, the number of slots that their information is spread over and the transmission mode and spreading factors used. All terminals monitoring the frame decode this field to determine whether they need to decode subsequent information. The length of the DL_MAP may be included as part of the DL_FCH, as may the spreading factor used to transmit it. The base station may select the spreading factor for the DL_MAP to be that corresponding to the lowest bit rate required by terminals connected to the base station or that corresponding to the lowest bit rate supported by the base station. A terminal can determine the position of its assigned slots from the DL_MAP by adding up the number of slots allocated in prior rows in the table.

On the uplink the slots may be numbered from 0 to n on the first FDMA channel, then on the subsequent FDMA channel and so on. The terminal can determine how many slots there are each channel from the length of the frame available for the uplink (that remaining after completion of the downlink) divided by the length of each slot. If a terminal has data requiring multiple slots it would normally be given these consecutively on the same carrier as this both simplifies the terminal transmission and minimises the control information required to describe the slot location. However, it is possible to give the terminal multiple allocations on different carriers (so long as they are not simultaneous) to achieve frequency hopping on the uplink.

The base station may be configured to communicate with one or more terminals in the cell at regular, predetermined intervals. Scheduling communications in this way may be advantageous in machine-to-machine networks, in which the terminals are often devices having small batteries. By scheduling communications at regular, predetermined intervals, terminals can enter a sleep mode between communications and only wake-up when a communication is expected.

Each of the cells into which the network may be divided will typically cover a large geographical area. The number of terminals located within each cell will therefore be large, and different terminals in the same cell will tend to be subjected to different interference conditions as a consequence of their different positions within the cell. Some terminals may be subject to localised interference, e.g. because of an interferer in the terminal's immediate vicinity or because the terminal is located close to a cell boundary. Some terminals may be subject to interference on a particular frequency in the frequency hopping sequence. Any interference will tend to affect a terminals ability to communicate, particularly its reception capability. The terminals may also differ in their ability to communicate as a consequence of differences inherent in their construction (e.g. as a consequence of different receive circuitry, antenna type, antenna height etc).

Interference from other users that may affect a terminal's ability to communicate includes emissions from licensed users, like signals from far-distant TV transmitters or spurious emissions from nearby TV transmitters. Other sources of potential interference may include devices operating in other wireless networks, such as Wi-Fi devices, wireless microphones, and other unlicensed users operating in whitespace. Interference may also be caused by the unintended emissions of devices that are not part of a wireless network, e.g. spurious emissions from faulty electric drills.

Figure 3:
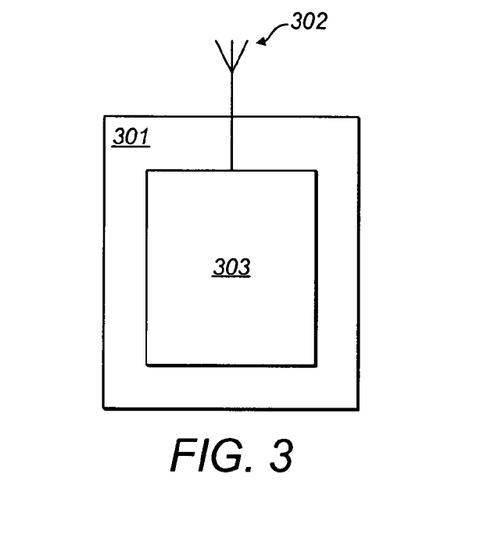
FIG. 3 shows an example of a communication device.

TDMA (time division multiple access) may be used to divide the channel between multiple users. The channel may be divided in time into downlink and uplink elements, so for part of the time the base station will be transmitting on a channel and for the remainder it will be listening on the same channel. The downlink channel will therefore operate for part of the duration of the frame (as shown in FIG. 3), the base station ceasing transmission to enable the terminals to transmit. The time frame for bursts as measured from the start of one downlink transmission to the start of the next is at least 1 second and suitably 2 seconds. The duty cycle may be variable and selected by the base station to best manage the resources on a frame-by-frame basis. In order to keep spurious emissions under control, a ramp-up and ramp-down process is preferably applied to each burst. As an example, 250 μs may be allowed for this process between the uplink and the downlink, and 150 μs may be allowed between the downlink and the uplink.

In all modes, the downlink channels may be frequency hopped at a rate of 1 hop per 2 seconds (30 hops per minute) using a pre-defined hopping sequence.

Error correction may be overlaid onto the data transmission at either a rate ¾ or ½ depending on the SNR. Suitable coding methods might be convolutional codes for longer packets and Golay codes for shorter packets.

Scrambling may be added to prevent certain data patterns occurring which might be problematic for the system, such as long strings of 0. The scrambling sequence may be derived from a linear feedback shift register taking as its input the frame number and current channel number. The latter avoids the decoding of channels on different frequencies which have been accidentally translated to the current frequency through image problems within the terminal.

The downlink channels may be designed to fit within TV channels with minimal adjacent channel leakage. The channels may be 8 MHz wide, suitably with a 5 MHz core bandwidth. Filtering may be used to achieve the required roll off (e.g. by using a root-raised cosine with B=0.4). Transmissions may be delivered on a single carrier designed to fit within the TV channels with minimal adjacent channel leakage. Multiple channels can be used within the same base station if required and if there is sufficient spectrum availability. If multiple channels are deployed there will typically be no signalling coordination between them, although their timing and hopping sequences could be coordinated.

The uplink could be based on multiple narrow channels allocated on a frequency division basis (see FIG. 3). Each channel could be 48 kHz wide and channel centre frequencies may be separated by 48 kHz. The channels may be filtered using root raised cosine (with, for example, B=0.4). Channels may be transmitted on a TDD (time division duplex) burst basis to fit in with the downlink operation. A ramp-up and ramp-down process may be used to keep adjacent channel emissions to a minimum. This may be achieved using a simple linear ramp.

Reception starts by detecting the presence of a carrier and searching for the downlink synchronisation burst. This is suitably a synchronisation word consisting of 48 symbols of alternating 0 and 1 followed by a 32-bit synchronisation word using concatenated codes. The codes may be Barker codes selected from one of 8 possible sequences. Sequences are preferably selected so that neighbouring base stations use different codes, reducing the probability of interference between them. The total burst may last 2.56 ms and enable terminals to lock to the carrier and the basic timing of the burst. They are then able to decode the frame configuration header which provides a range of information such as the base station identity and channel map (as described above). Terminals with no pre-knowledge of channels will search all available whitespace channels until they find a carrier. Terminals that have previously acquired a carrier may be able to determine the expected location of the carrier or a subset of possible carriers and reduce their search accordingly.

Spreading may be used in order to extend the range (at the expense of data rates). A wide range of spreading factors is available to tailor the data rate to the propagation conditions.

Spreading codes also provide an additional tool to overcome the absence of frequency planning between base stations. Neighbouring base stations may be allocated different subsets of the same codes such that when they do transmit on the same frequency there is still some possibility for the terminals to decode the signal intended for them. The worst interference is likely to occur at a cell edge where the interfering signal can be almost as strong as the wanted signal. At a cell edge it is likely that the SNR will be low. Therefore, the base station may be configured to select a higher spreading factor for communications with terminals it determines to be located near the cell boundary. This makes it possible to make use of code diversity.

Spreading codes could be applied on a TDMA basis with different codes being applied to each terminal according to its SNR. The selection of spreading code is made by the base station according to channel quality information returned from the terminal.

The spreading codes are of length $2^N-1$ and are defined as follows:

| Spreading factor | Code type | Number of codes |
| --- | --- | --- |
| 15 | Kasami | 4 |
| 31 | Gold | 32 |
| 63 | Gold | 64 |
| 127 | Gold | 128 |
| 255 | Kasami | 16 |
| 511 | Gold | 512 |
| 1023 | Gold | 1024 |

These code sets have very good auto-correlation and cross-correlation properties, making them suitable for use with channels that have severe multipath and for use with multi-code spreading to convey multiple bits per symbol. As shown in the table above, there are fewer such codes for Kasami code sets than for Gold code sets, but the Gold codes are not available for all spreading factors.

The spreading factor used by a base station depends on the required processing gain to provide the necessary range for that cell. Some control fields within the MAC frame are preferably sent with the maximum spreading factor to ensure that all terminals can receive the control information (as discussed above). However, it is inefficient for a base station to use a spreading factor that is unnecessarily high and, therefore, for other portions of the frame the base station preferably selects, a spreading factor that is tailored to the reception capabilities of the particular terminal(s) for whom that portion of the frame is intended.

The data may be initially encoded using BPSK (using 1 bit per symbol) or QPSK (using 2 bits per symbol). The selected spreading code may be applied separately to the I and Q components of each symbol. BPSK can be used to provide some extra processing gain when operating at the maximum supported spreading factor, in preference to doubling the spreading factor. In other cases, better performance may be achieved by using QPSK with a spreading factor that is twice as large to achieve the same overall data rate.

The base station may opt to use multiple codes rather than just a single code. For multi-code spreading there are an additional n bits per symbol encoded using a 1 in $2^n$ code selection from the available codes, in addition to the 2 encoded bits per symbol for the QPSK constellation. The selected codes may be used to separately modulate the I and Q data, as before.

The use of multiple codes to convey additional bits per symbol improves the $E_b/N_0$ performance of the modulation. Effectively, it is a form of coding. The improvement may be diluted by the addition of FEC (forward error correction coding) because the coding gain of FEC is lower for multi-code modulation (because the underlying modulation is already more efficient). Nonetheless, there are significant $E_b/N_0$ benefits in using a 1 in 4 code selection, such that a total of 4 bits are transmitted per symbol including the 2 bits for the QPSK modulation. It also allows the use of larger spreading factors for a given data rate, which improves the performance of a Rake receiver by allowing the length of the spreading codes to exceed the delay of all significant multipath components. The drawback is that multiple correlators are required in the receiver, but for a 1 in 4 code selection this is not a big overhead given that chip timing is known at this stage of the decoding process.

Carrier phase tracking may be required, likewise a Rake receiver and Rake finger tracking (i.e. channel impulse response tracking). This means that it can be suitable for use with channels that are varying a rate that is less than roughly $\frac{1}{10}^{th}$ of the symbol rate.

The spreading gain in the transmission could be used in order to be able to receive a signal in poor SNR conditions. This method also benefits from Rake equalisation as widely used in CDMA systems such as 3G. Rake reception convolves the received signal with the spreading code to determine the timing, phase and magnitude of each path. The receiver can use this knowledge to construct an equaliser.

Further range extension may be provided for situations in which the SNR is extremely low. This might be suitable, for example, for reading energy meters located in basements or remote dwellings.

The simple modulation scheme NC OFK could be used. Under this modulation scheme the receiver does not need to maintain carrier lock, but simply looks at the difference between consecutive symbols (rather than their absolute values). This allows operation at very low SNR levels, albeit at relatively low data rates and with some penalties in BER as a result of the use of differential coding.

The spreading code may be used directly to form the I and Q signals, without any additional BPSK or QPSK modulation. A convenient implementation is simply to apply the same modulator as discussed above, but either to fix the phase at a single QPSK constellation point, for example (1+j), or to fix the phase at a single BPSK constellation point, for example (1+0j).

Since there is no phase modulation to encode data bits, all information is conveyed using code selection. So to transmit n bits per symbol, a 1 in $2^n$ code selection can be used for each symbol. Therefore, a minimum of 2 codes should be used, in order to convey 1 bit per symbol. There are significant $E_b/N_0$ benefits in using larger values of n. Typical values of n are 2 and 4, corresponding to a 1 in 4 or a 1 in 16 code selection respectively.

Since there is no phase information, the receiver does not need to track carrier phase and can instead apply a magnitude operation to the output of each correlator to determine the most likely transmitted code. In other words, this kind of modulation supports a fully non-coherent receiver. This means that the modulation is robust to channels whose phase is varying at a rate that is approaching the symbol rate, and so is suitable for use with very high spreading factors. In the case that the channel phase is varying faster than the symbol rate, it is still possible to demodulate the signal by partitioning the correlator integration over each symbol period into a number of shorter coherent integrations which are then summed incoherently. Inevitably, there is an $E_b/N_0$ performance penalty in doing this, but it does allow very high processing gains to be used with channels that are not stationary.

Making use of spreading codes to extend the range at the expense of data rate allows the possibility of neighbouring cells using orthogonal spreading codes, such that if inter-cell interference occurs on one or more frequencies it may still be possible for some information to be received by the terminals. For simplicity, all base stations may make use of the same code sequences but with different offsets. The assignment of the offset is preferably made such that neighbouring base stations have assignments that provide the maximum orthogonality. In this way code planning does not change according to assigned frequencies and so only needs to be altered when new base stations are added to the network. For example, if the terminal is operating at a spreading factor of 63, then there are 64 available offsets, of which each base station will typically use a subset of 4 (assuming a 1 in 4 code selection is being used to convey 2 bits per symbol). Therefore, in this example, different code subsets can be allocated to up to 16 neighbouring base stations.

An alternative approach is to use different chip-rate scrambling sequences for each base station. This approach may result in a lower level of interference suppression than selecting different code subsets from the available Gold codes, because the Gold codes have optimum cross-correlation properties.

An example of the functional blocks that may be comprised in a communication device according to one embodiment of the invention are shown in FIG. 3. The communication device, shown generally at 301, comprises a communication unit 303 connected to an antenna 302 for transmitting and receiving messages.

The apparatus shown in FIG. 3 is shown illustratively as comprising a number of interconnected functional blocks. This is for illustrative purposes and is not intended to define a strict division between different parts of hardware on a chip. In practice, the communication device preferably uses a microprocessor acting under software control for implementing the methods described herein. In some embodiments, the algorithms may be performed wholly or partly in hardware.

A terminal capable of operating in the wireless network suitably has only a single antenna in order to maintain a small form factor, simplicity and low energy consumption. The base station may similarly have only one antenna (as shown, for example, in FIG. 3). However, advantageously a base station may have two antennas to achieve processing gains.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A communication device configured to communicate according to a protocol in which data is communicated via a series of frames, and every frame comprises:
   a downlink portion for transmissions by the communication device using a time division multiple access protocol, said downlink portion comprising a control portion; and
   an uplink portion for transmissions to the communication device using a frequency division multiple access protocol;
   wherein the duration of each frame is greater than one second;
   wherein the uplink portion has first channels for allocated uplink data transmissions in parallel with second channels allocated for uplink contended access; and
   wherein the control portion has an information field describing a channel structure and further has a downlink map portion that is disposed between the information field and a data portion for sending data to terminals connected to the communication device, and that informs the terminals as to whether there is any information in the frame for each of the terminals and whether each of the terminals has an uplink slot reserved for a respective terminal to transmit information;
   wherein the information field includes a value indicating a length of the downlink map portion and a first spreading factor used to transmit the downlink map portion, wherein the first spreading factor corresponds to one of a lowest bit rate required by the terminals or that corresponding to the lowest bit rate supported by the communications device;
   wherein the downlink map portion has a table of terminal identities, a number of slots over which information for each of the terminals is spread over, information identifying a transmission mode, and information identifying second spreading factors used for transmitting the data for each of the terminals; and
   wherein the control portion of the downlink portion comprises an acknowledgement portion starting immediately after the downlink map portion is complete, wherein the acknowledgement portion includes data indicating acknowledgement of previous uplink transmissions, and wherein the data portion starts immediately after the acknowledgement portion is complete.

2. The communication device as claimed in claim 1, configured to communicate via the series of frames, each frame having the same duration.

3. The communication device as claimed in claim 2, configured to communicate via the series of frames that each have a duration of 2 seconds.

4. The communication device as claimed in claim 1, configured to transmit the control portion of each frame using a relatively low data rate so as to maximise the likelihood of the control portion being successfully received by a terminal.

5. The communication device as claimed in claim 1, configured to transmit the control portion using the lowest data rate supported by the communication device.

6. The communication device as claimed in claim 1, configured to communicate with a plurality of terminals.

7. The communication device as claimed in claim 6, configured to transmit the control portion of each frame using the lowest data rate required by the plurality of terminals.

8. The communication device as claimed in claim 6, configured to transmit the control portion using the lowest data rate required by all terminals connected to a cell with which the communication device is associated.

9. The communication device as claimed in claim 1, configured to arrange the downlink portion of each frame so that every downlink portion comprises:
The control portion; and
the data portion.

10. The communication device as claimed in claim 9, configured to arrange the data portion of the downlink portion of each frame so that the data portion of each frame comprises a series of time slots, the communication device being configured to:
allocate a time slot to a communication with a terminal; and
communicate with that terminal in the allocated time slot.

11. The communication device as claimed in claim 1, configured to communicate via a wireless network.

12. The communication device as claimed in claim 11, wherein the wireless network that operates in whitespace.

13. The communication device as claimed in claim 11, wherein the wireless network that is configured for machine-to-machine communication.

14. The communication device as claimed in claim 1, wherein the uplink portion and the downlink portion are transmitted on a same third channel.

15. The communication device as claimed in claim 14, wherein each of the first channels and each of the second channels has a width of 48 kilohertz, and wherein the third channel has a width of 8 megahertz and a core bandwidth of 5 megahertz.

16. The communication device as claimed in claim 1, wherein the information field further includes an indication of frequencies used in a channel hopping sequence for at least the downlink portion that enables the terminals to determine the channel hopping sequence, and wherein the information field further includes a 16-bit medium access control (MAC) frame count that enables the terminals to determine where a base station transmitting the respective frame is in the channel hopping sequence.

17. A method for communicating via a series of frames, by arranging each frame so that every frame comprises:
a downlink portion, said downlink portion comprising a control portion; and
an uplink portion wherein the uplink portion has first channels for allocated uplink data transmissions in parallel with second channels allocated for uplink contended access;
wherein the total duration of each frame being greater than one second; and
wherein the uplink portion and the downlink portion are transmitted on a same third channel;
wherein the control portion has an information field describing a channel structure and further has a downlink map portion that is disposed between the information field and a data portion for sending data to terminals connected to a communications device, and that informs the terminals as to whether there is any information in the frame for each of the terminals and whether each of the terminals has an uplink slot reserved for a respective terminal to transmit information;
wherein the information field includes a value indicating a length of the downlink map portion and a first spreading factor used to transmit the downlink map portion, wherein the first spreading factor corresponds to one of a lowest bit rate required by the terminals or that corresponding to the lowest bit rate supported by the communications device;
wherein the downlink map portion has a table of terminal identities, a number of slots over which information for each of the terminals is spread over, information identifying a transmission mode, and information identifying second spreading factors used for transmitting the data for each of the terminals; and
wherein the control portion of the downlink portion comprises an acknowledgement portion starting immediately after the downlink map portion is complete, wherein the acknowledgement portion includes data indicating acknowledgement of previous uplink transmissions, and wherein the data portion starts immediately after the acknowledgement portion is complete.

18. The method as claimed in claim 17, wherein the downlink portion is transmitted using a time division multiple access protocol, and wherein the uplink portion is transmitted using a frequency division multiple access protocol.

19. The method as claimed in claim 17, wherein each of the first channels and each of the second channels has a width of 48 kilohertz, and wherein the third channel has a width of 8 megahertz and a core bandwidth of 5 megahertz.

20. The method as claimed in claim 17, wherein the information field further includes an indication of frequencies used in a channel hopping sequence for at least the downlink portion that enables the terminals to determine the channel hopping sequence, and wherein the information field further includes a 16-bit medium access control (MAC) frame count that enables the terminals to determine where a base station transmitting the respective frame is in the channel hopping sequence.

* * * * *